March 6, 1956 J. E. BEVINS ET AL 2,737,433
RECORDING AND MEASURING INSTRUMENT
Original Filed April 16, 1945 10 Sheets-Sheet 1
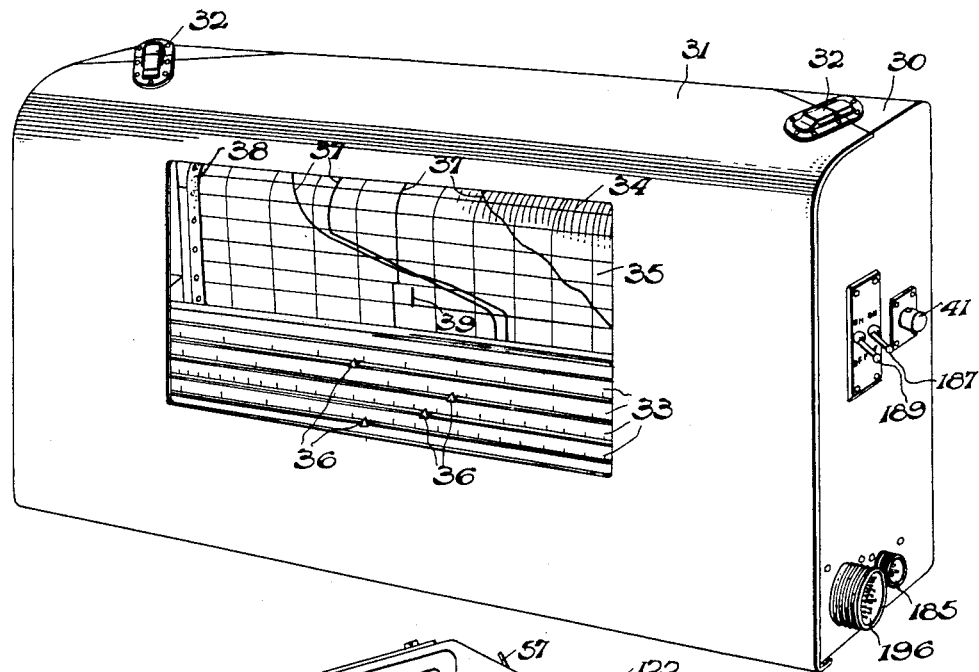
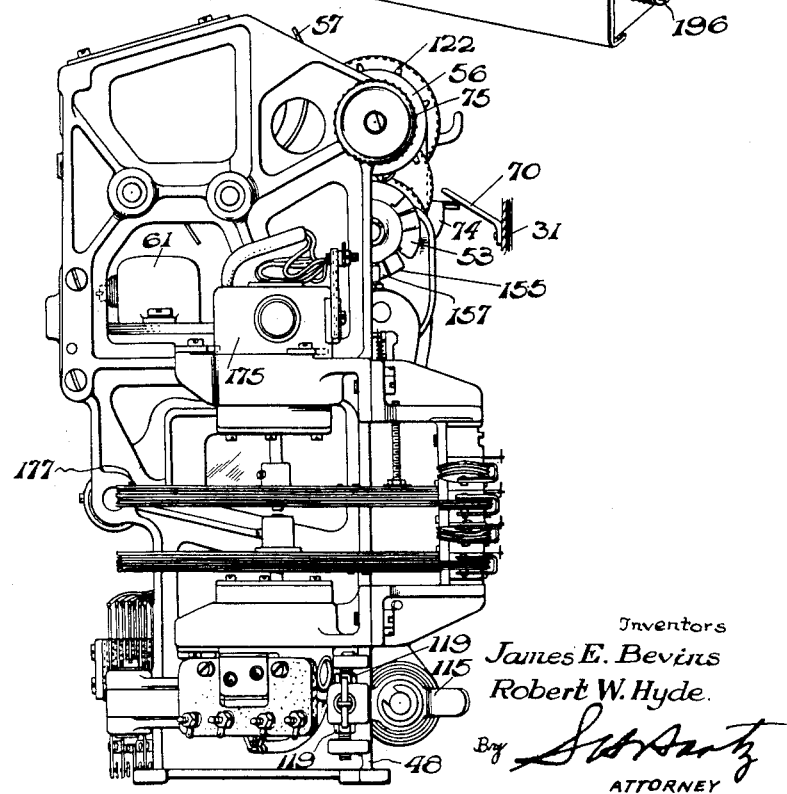
Inventors
James E. Bevins
Robert W. Hyde
By [signature]
ATTORNEY

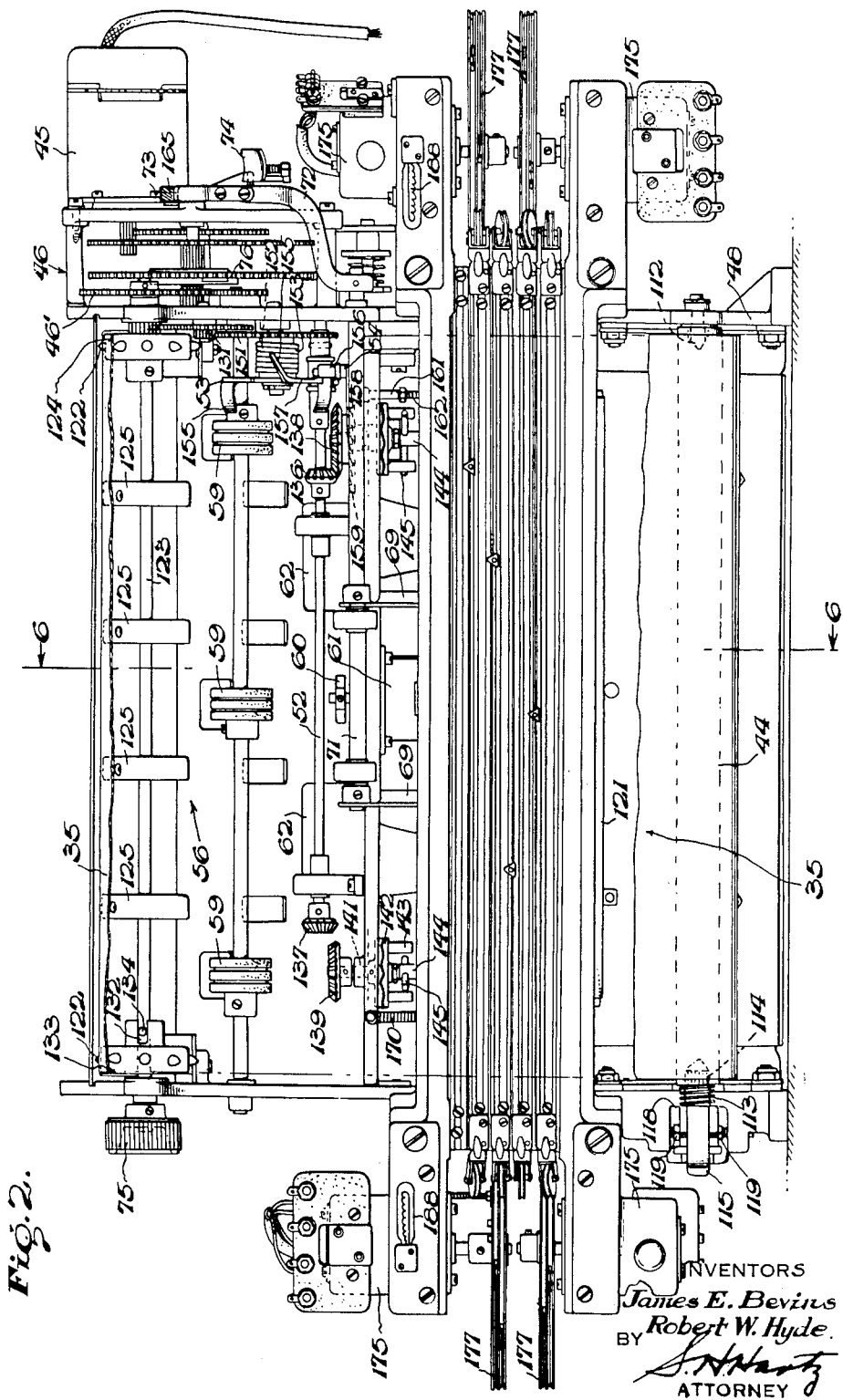

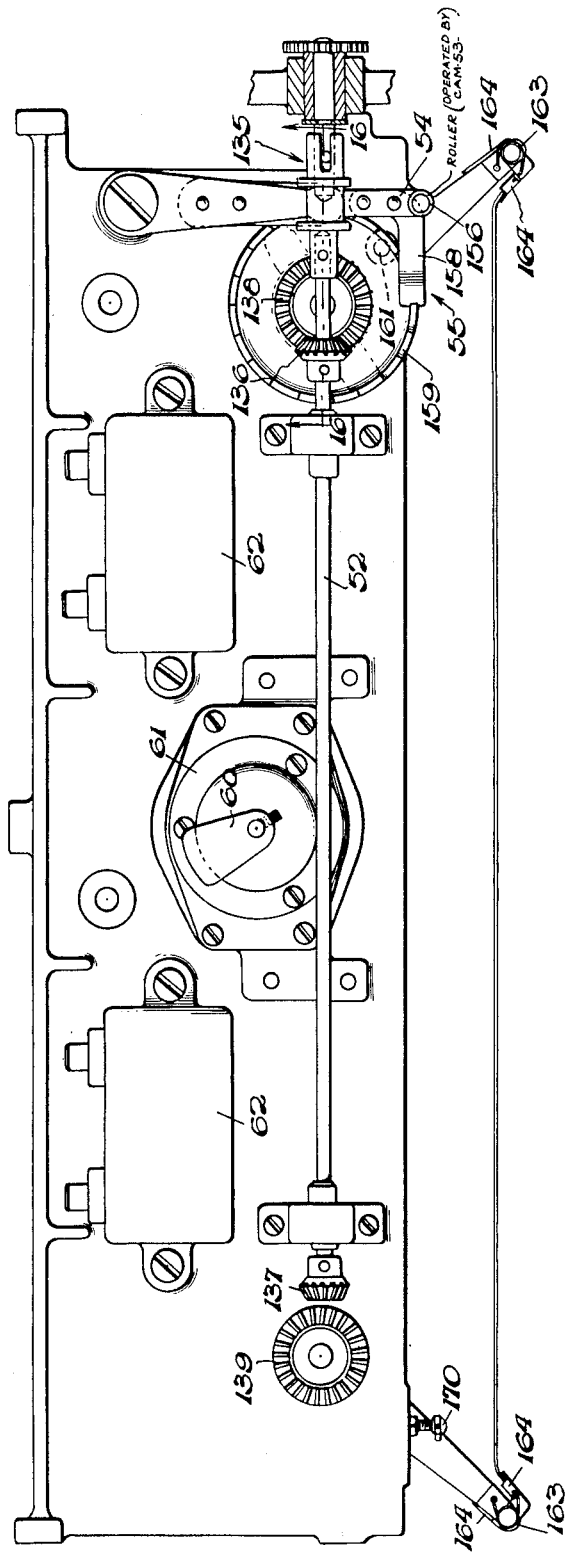
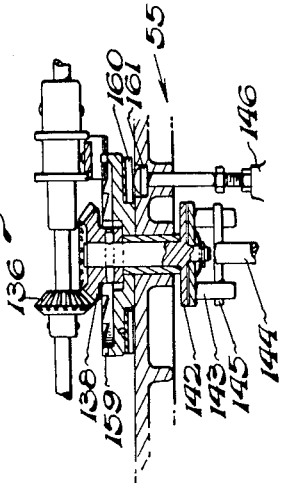
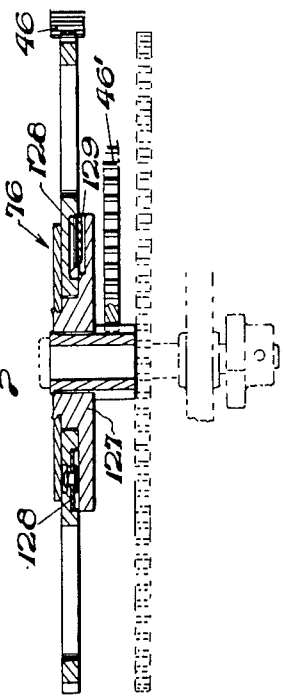
Inventors
James E. Bevins
Robert W. Hyde
By [signature]
ATTORNEY March 6, 1956  J. E. BEVINS ET AL  2,737,433
RECORDING AND MEASURING INSTRUMENT
Original Filed April 16, 1945  10 Sheets-Sheet 4
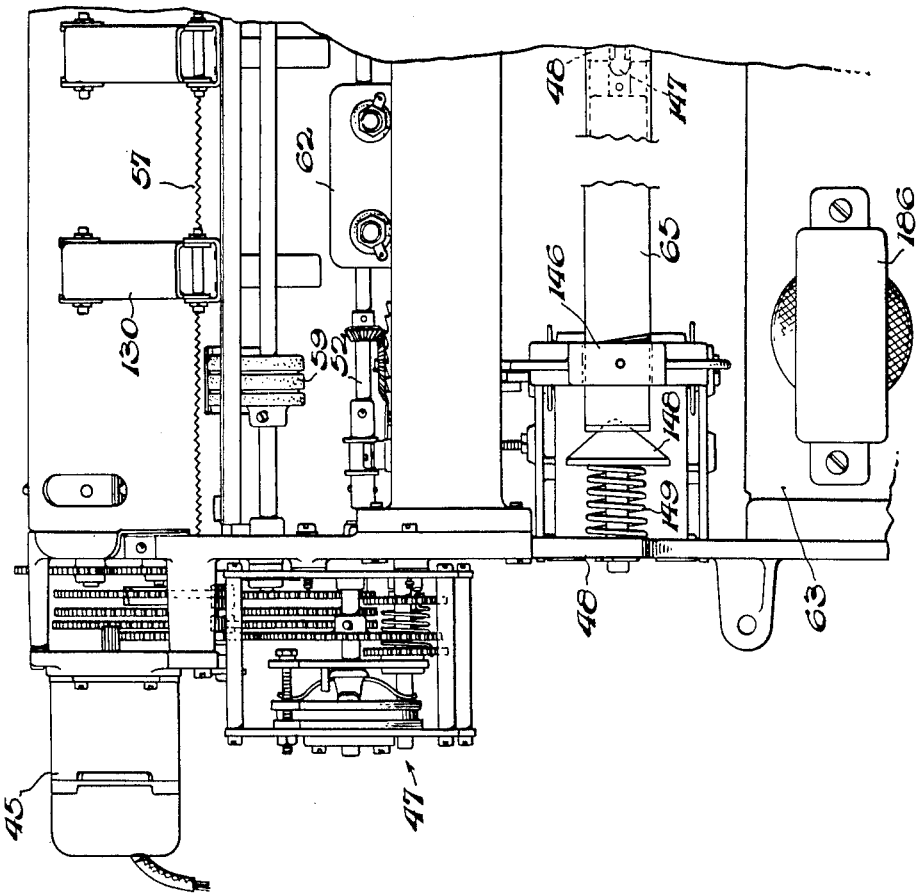
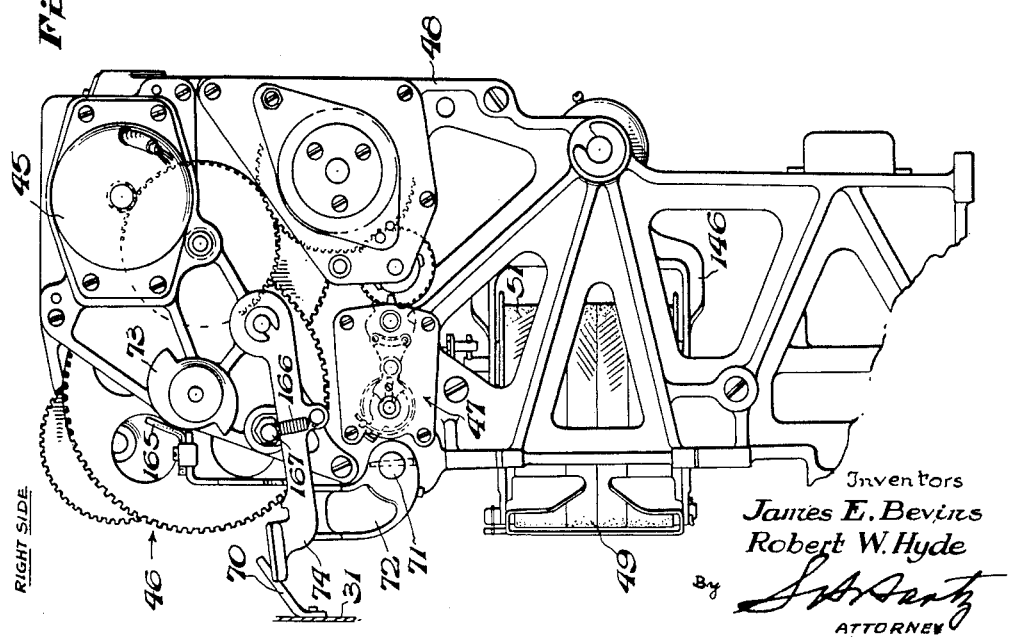
Inventors
James E. Bevins
Robert W. Hyde
By
ATTORNEY March 6, 1956 J. E. BEVINS ET AL 2,737,433
RECORDING AND MEASURING INSTRUMENT
Original Filed April 16, 1945 10 Sheets-Sheet 5
Fig. 6.
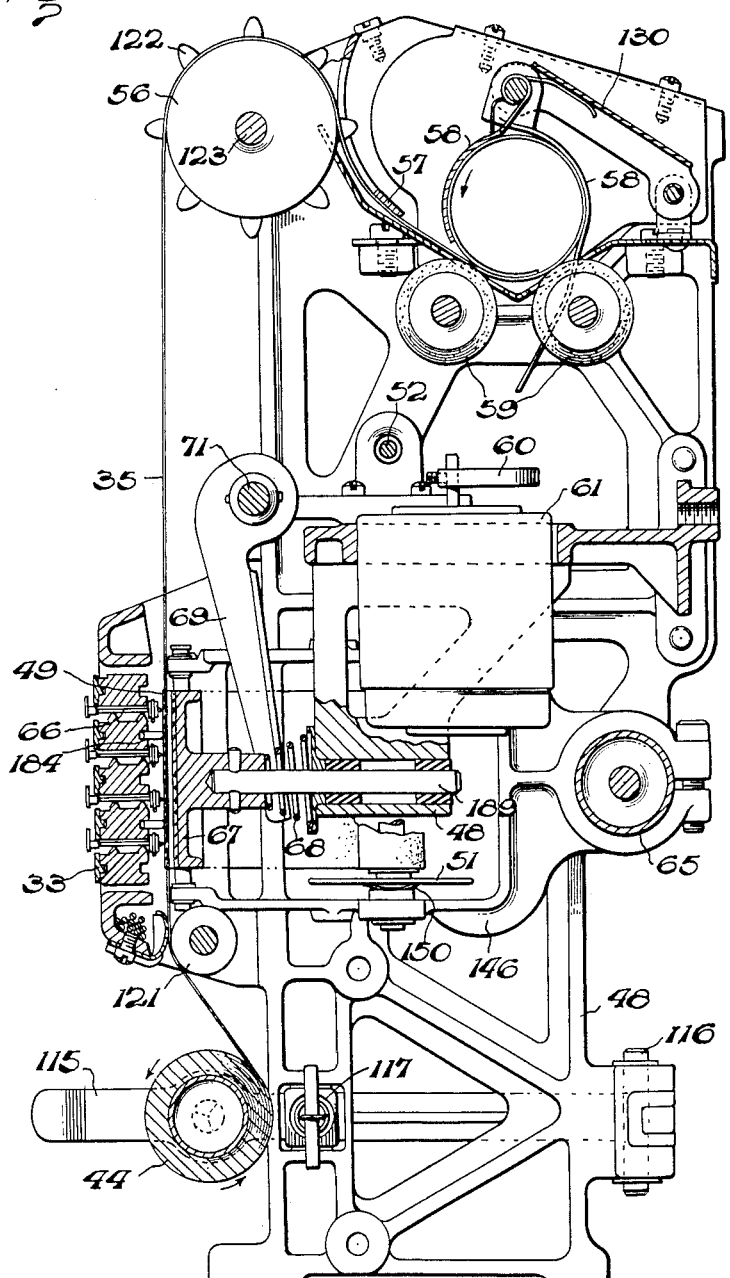
Inventors
James E. Bevins
Robert W. Hyde
By 
ATTORNEY

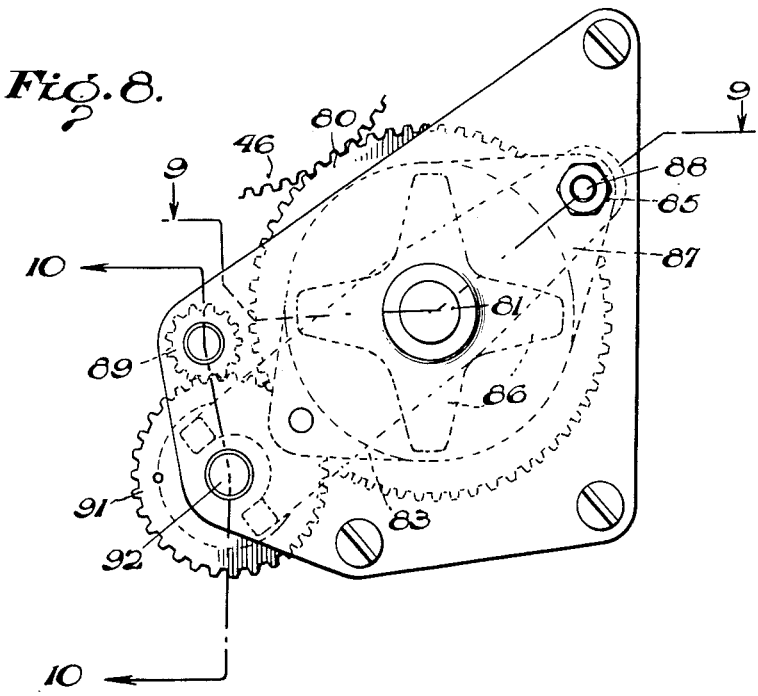
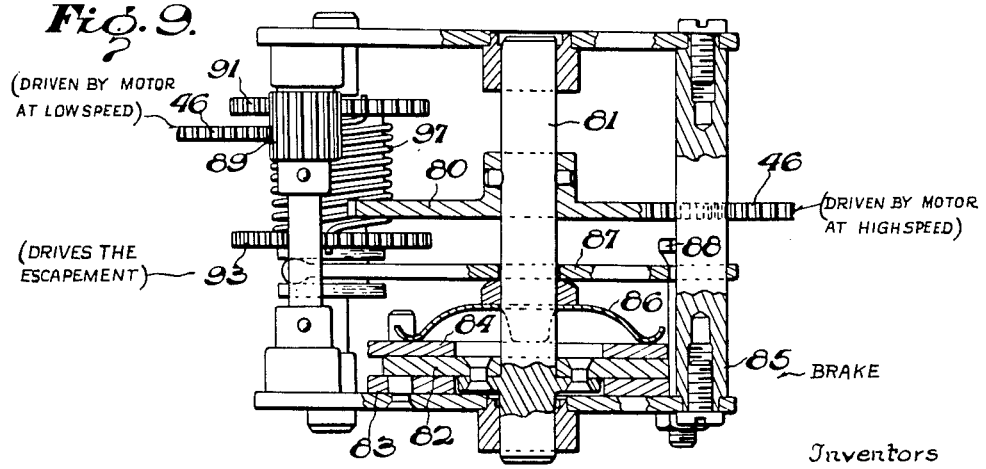

March 6, 1956 J. E. BEVINS ET AL 2,737,433
RECORDING AND MEASURING INSTRUMENT
Original Filed April 16, 1945 10 Sheets-Sheet 7
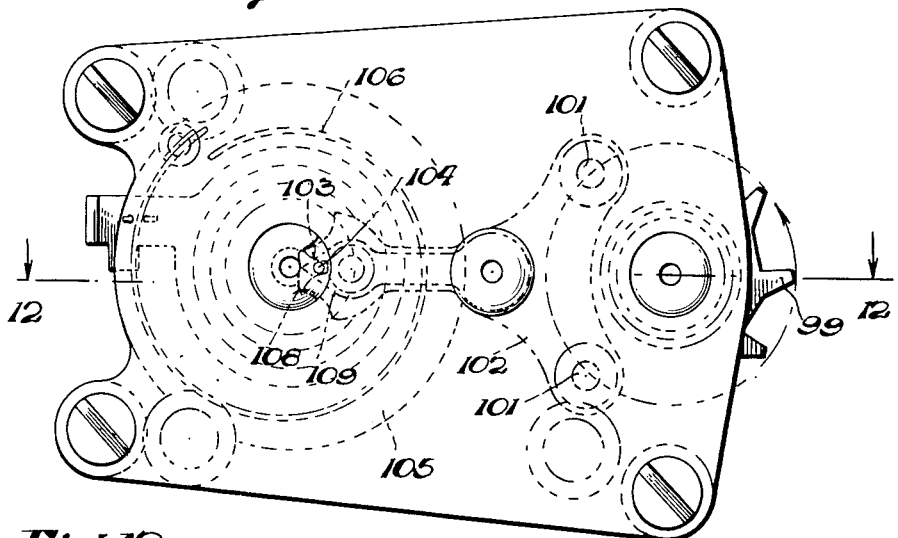
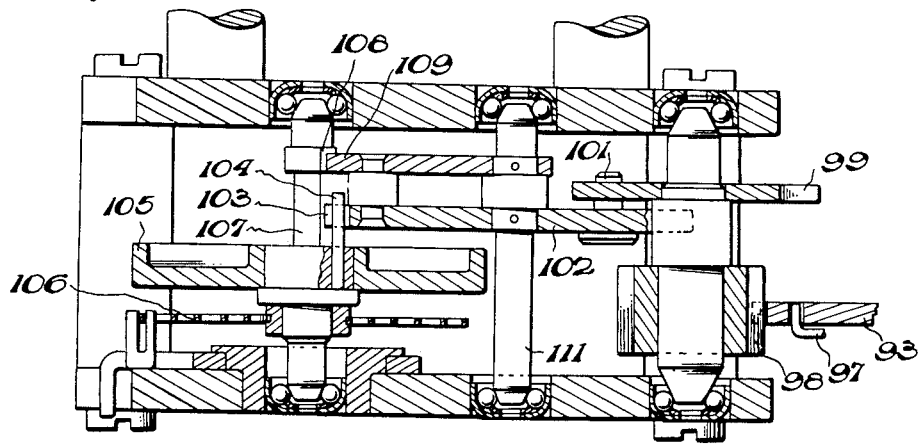
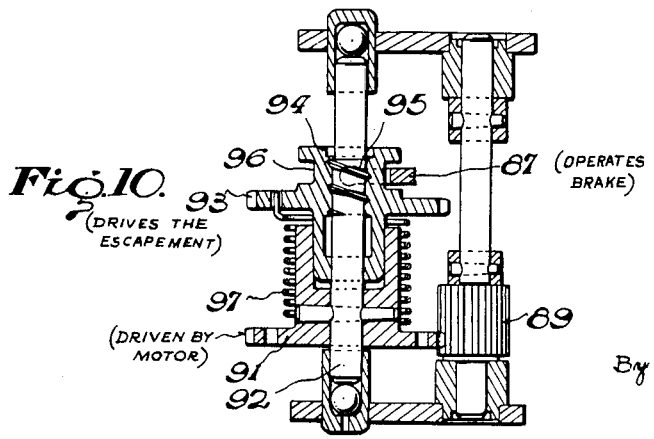
Inventors
James E. Bevins
Robert W. Hyde
By
ATTORNEY

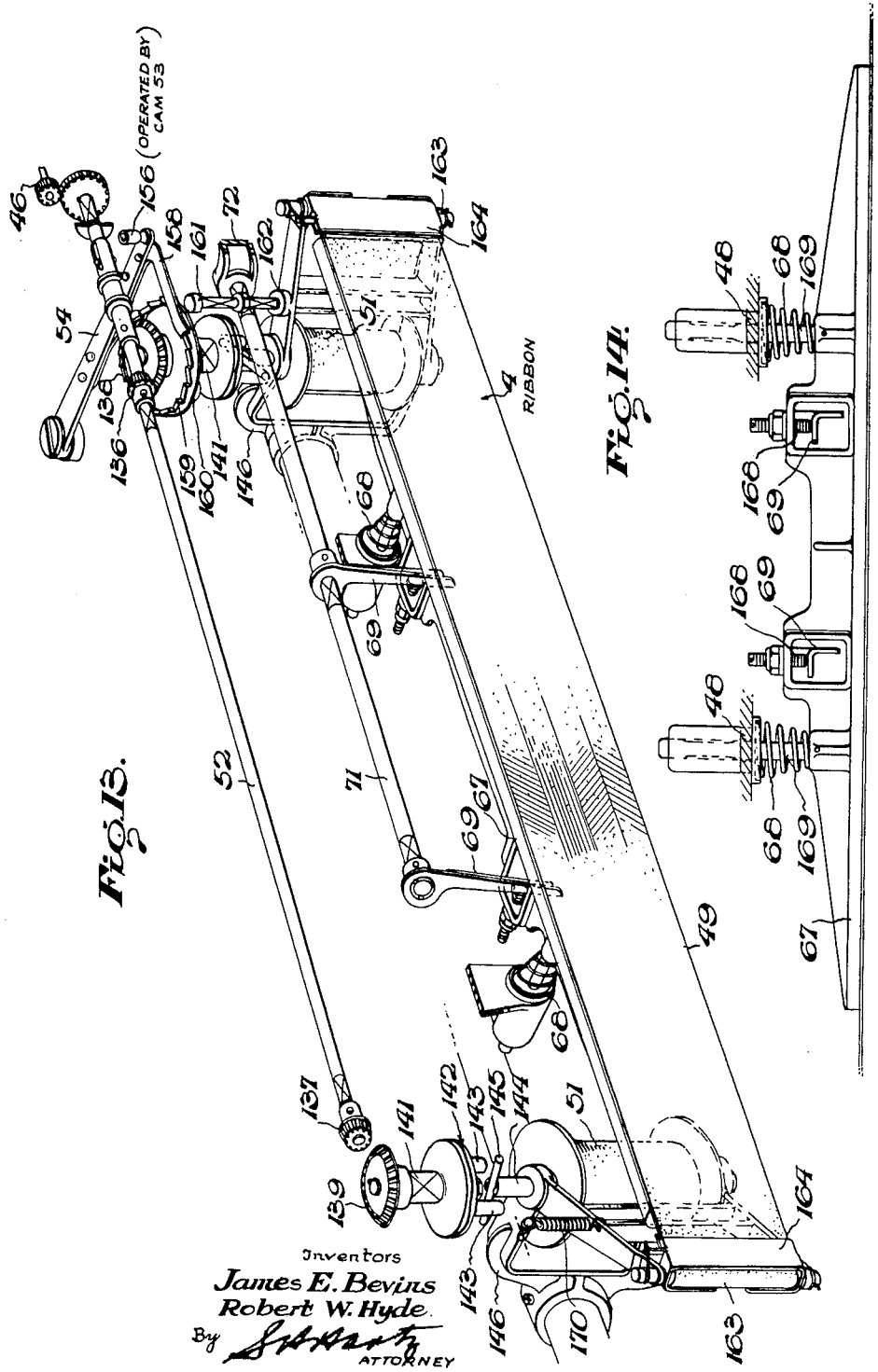

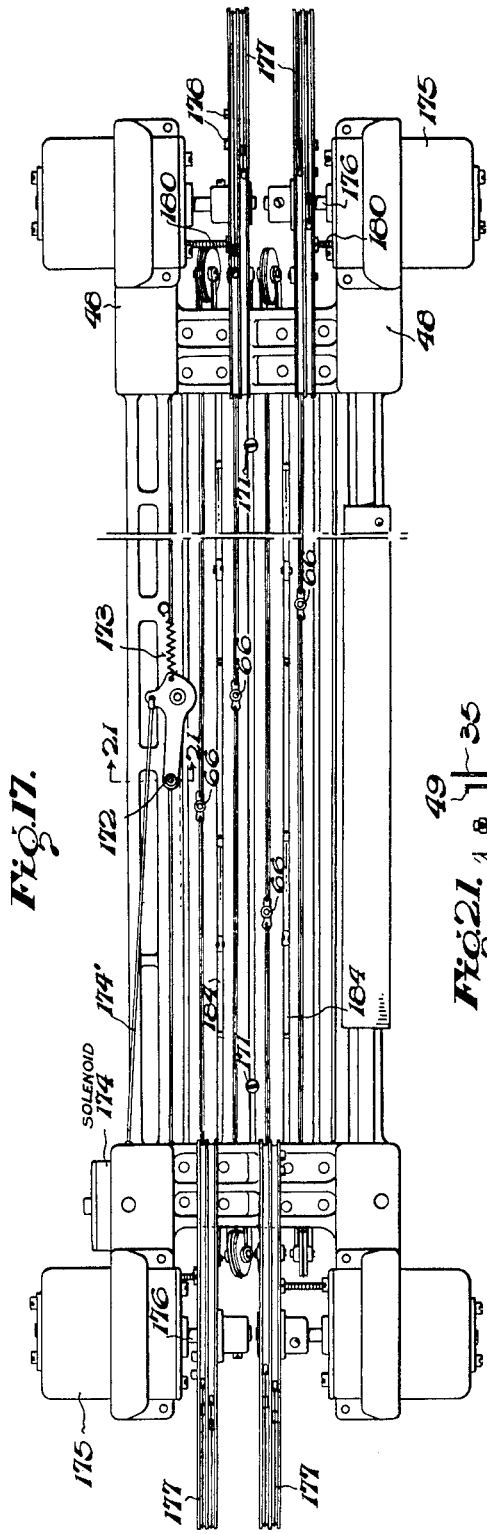
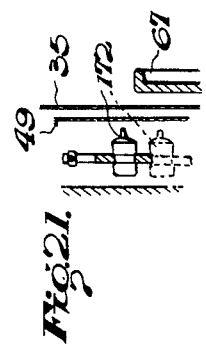
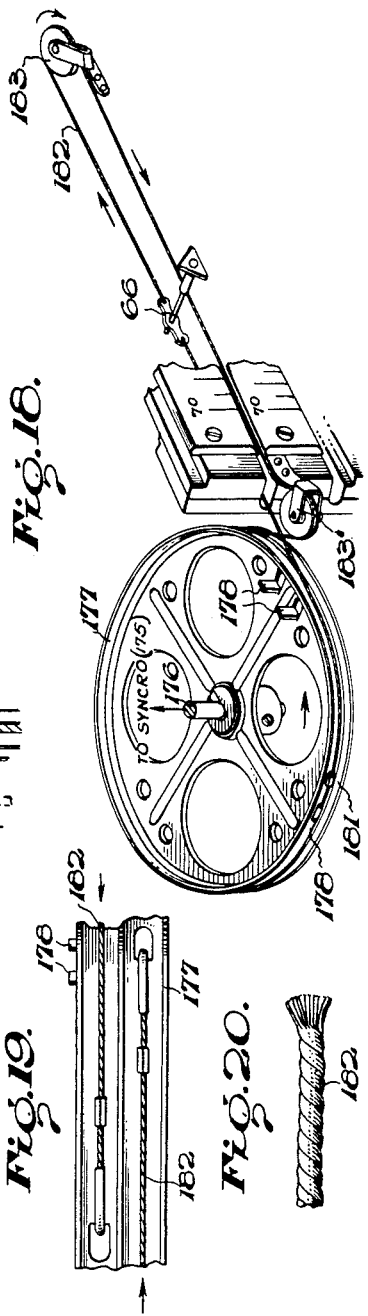
Inventors
James E. Bevins
Robert W. Hyde

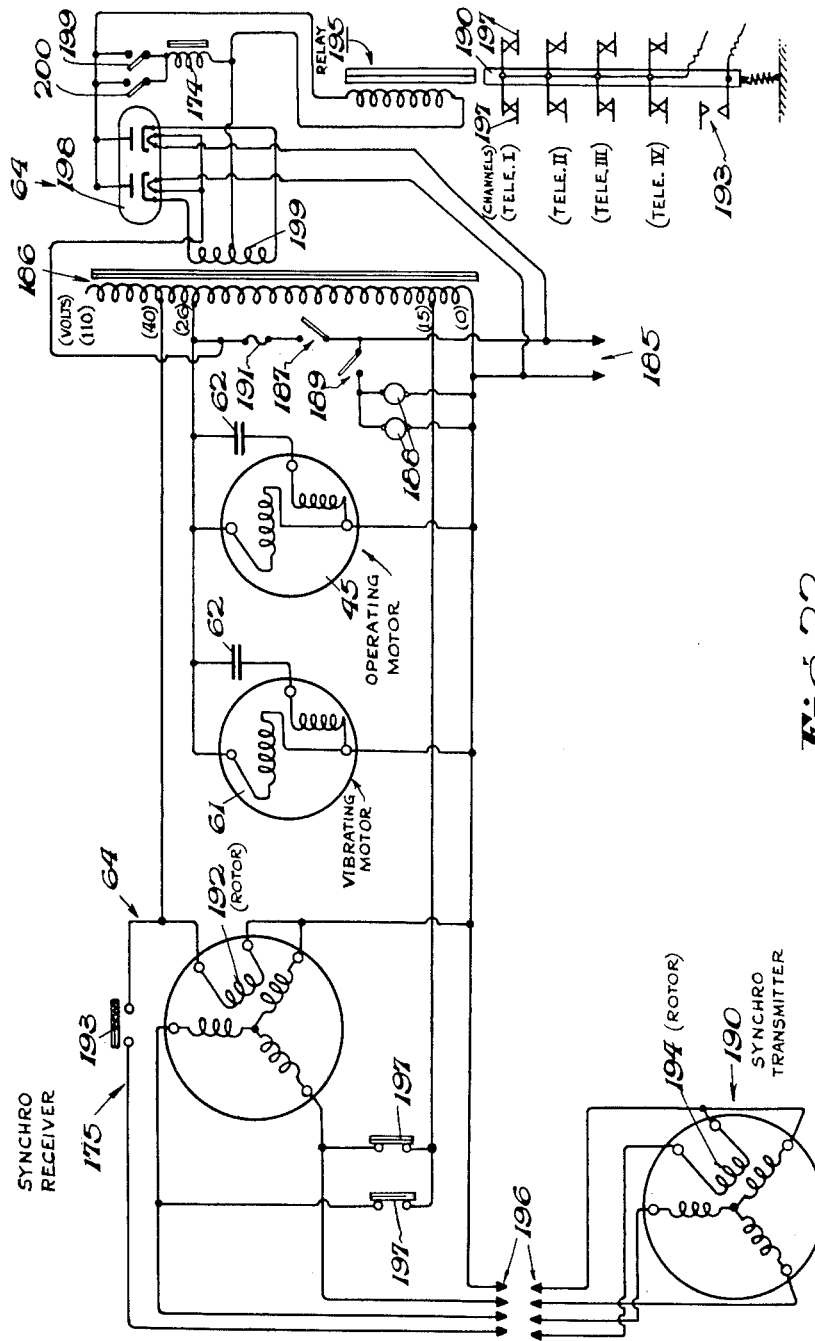

United States Patent Office 2,737,433
Patented Mar. 6, 1956

2,737,433

RECORDING AND MEASURING INSTRUMENT

James E. Bevins, Ramsey, and Robert W. Hyde, Englewood, N. J., assignors to Bendix Aviation Corporation, Teterboro, N. J., a corporation of Delaware Original application April 16, 1945, Serial No. 588,600. Divided and this application March 13, 1950, Serial No. 149,926

4 Claims. (Cl. 346—49)

This invention relates generally to recording and/or indicating instruments and more particularly to a novel combined instrument adapted for permanently recording with respect to time and for simultaneously indicating the instantaneous values of various functions or conditions encountered during craft flight such as, for example, airspeed, pressure, humidity, temperature, etc.

An object of the present invention is to provide an instrument of the foregoing character in which each of the functions being considered is measured at a distant point by an electrical transmitter which is connected to a related electrical repeater at the instrument, the repeater actuating a marker pin relative to a recording chart as well as an index relative to a related graduated scale in correspondence with the value of the conditions being measured.

A further object is to provide a high speed and light weight recorder of a plurality of variable functions such as, for example, airspeed, pressure, humidity and temperature.

Still another object is to provide novel means for converting angular motion of a self-synchronous repeater into linear motion of a marking and/or indicating index with a minimum of friction and without the use of amplifiers or servo systems.

A further object is to provide a novel combined indicator and recorder of the values of a number of variables having continuously readable indications relative to graduated scales and with the recorded values for a pre-selected period of time visible on the chart from the exterior of the instrument, a cover having a window therein being provided for the instrument, the window being arranged over the chart and scales.

This is a division of patent application Serial No. 588,600, filed April 16, 1945, now issued as Patent No. 2,551,866 on May 18, 1951.

The above and other objects and advantages of the invention will appear more fully hereinafter from a consideration of the detailed description which follows taken together with the accompanying drawings. It is to be expressly understood, however, that the drawings are for the purpose of illustration and description only and are not designed as a definition of the limits of the invention.

In the drawings wherein like reference characters refer to like parts throughout the several views:

Figure 1 is a perspective view, generally from the front, of the instrument with the cover on;

Figure 2 is a front elevation of the instrument with the cover removed;

Figure 3 is a generally corresponding plan view, partially in section, showing the ribbon handling mechanism;

Figure 4 is partial elevation, partially in section, of the righthand end of the recorder showing the operating motor and its regulator, the platen-operating mechanism and its lock-out detent, and the ribbon mechanism.

Figure 5 is an elevation of the lefthand end of the recorder, also with the cover removed.

Figure 6 is a sectional elevation, the section being taken along line 6—6 in Figure 2, showing the chart handling mechanism.

Figure 7 is a partial rear elevation showing the location of the re-roll device and of the chassis for the electrical centering of the synchros when starting up;

Figure 8 is a somewhat diagrammatic view of the speed control for the motor drive taken, generally looking toward the lefthand end of the instrument, with the synchro unit removed;

Figure 9 is a sectional mechanism diagram of the control of Figure 8, taken along lines 9—9;

Figure 10 is a sectional view of the screw-differential mechanism which actuates the control of Figures 8 and 9, being taken along line 10—10 of Figure 8;

Figures 11 and 12 are respectively an end elevation and section of the escapement mechanism, Figure 12 being taken along line 12—12 in Figure 11.

Figure 13 is a perspective view of the ribbon and platen drive with the indicating mechanism removed to show the ribbon drive;

Figure 14 is a plan view, partially in section, of the platen and a portion of its actuating means;

Figure 15 is a section of an irreversible clutch in the chart-drive gearing;

Figure 16 is a sectional elevation detail of the ribbon oscillating means taken along line 16—16 of Figure 3;

Figure 17 is a rear elevation showing an indicating and marking pin, and its cord and pulley arrangement;

Figure 18 is a diagrammatic perspective of the same means;

Figure 19 is a detail of the fastening means for the cord;

Figure 20 is greatly enlarged detail of the cord;

Figure 21 is a detail, partially in sectional elevation, of the reference marker; and, Figure 22 is a wiring diagram showing the electrical zeroing means particularly.

The device disclosed, by way of example, continuously indicates the values of four variables, including the velocity of a craft carrying the instrument, by the position of indices moved longitudinally along their respective scales. It also records each of these values in a different color on a standard strip chart which is ten inches wide on the graduated portion and which moves at twelve inches per hour. It also records a standard width by marginal marks so as to indicate any errors due to changes in width of the chart, such as are due to variations of relative humidity and temperature of the air within the instrument casing.

The recorder is also effective to provide reference marks in the middle of the chart so that the times of any noteworthy values of the recorded variables may be later identified, e. g., the time of starting a trip or of using a radio in the craft. The operator merely presses a reference marker button to cause the mark to be made. This button may be either at the recorder or at a distance since it actuates a switch which controls a solenoid which in turn moves the marker, against a spring, into operative position. This switch may also be operated automatically.

While the recording is intermittent, it is preferably at such a high rate, once per second, e. g., that the records of each value normally appear as continuous lines.

The instrument is supplied with 26 volt, 400 cycle power. It contains two lights for the chart and the four indicating scales, a manually operated light switch being furnished for turning the lights on and off. A section of the chart is always visible which shows the operator at all times what has happened in the preceding fifteen minutes.

Two electrical motors are operated from the power supply when a motor switch is turned on. One motor merely turns an eccentric weight to cause a slight vibration which substantially eliminates errors of the measurements due to mechanical or coulomb friction. The other motor drives the chart and a platen for tapping the chart and a four-color ribbon against four recording pins. Since the frequency of the power supply on a craft is occasionally not of sufficient accuracy for timing the chart, the chart-operating motor used is of the induction type which can slip considerably without stalling and is provided with a brake to regulate its speed, the vibrator-motor being the the same sort.

The brake is actuated by the difference between a speed that is proportional to the operating motor speed and that of an escapement which is driven by a spring which is wound by the motor, a screw-differential mechanism being used for this purpose. This compact light-weight regulated motor solves the problem of operating the recorder at a substantially constant speed as is required for subsequent interpretation of the records.

The chart-operating mechanism is geared to the speed-regulated motor so that the timing roll turns the chart at the desired speed of twelve inches per hour. The chart passes into guides which cause it to be re-rolled, two re-roll rollers being turned at a peripheral speed of approximately twenty-four inches per hour to ensure a tight roll which is convenient for filing. A tear-off strip with serrated teeth is provided. This chart-handling arrangement is very light and eliminates the usual detachable heavy re-roll roller that occasionally is lost or mislaid when needed.

The ribbon is also driven by the regulated motor which turns two driving gears, one of which is engaged at a time with its respective spool, a splined connection being used for the shaft that carries the two driving gears. The drive is shifted from one spool to the other by a four-pronged cam which actuates a reversing lever that moves the driving-gear shaft endwise on a reversal. This cam is also driven by the regulated motor so that a reversal occurs every one and one-half hours. Friction clutches are provided between the driven gears and the spools so that the ribbon can neither be damaged nor stall the recorder in case the ribbon is not reversed when it first reaches the end of its travel from one spool to the other.

To ensure the use of the entire surface of the ribbon, a two-lobed cam is provided to slowly oscillate the ribbon vertically. This cam is attached to a 40-tooth ratchet which is pawl-actuated by the reversing lever on each complete reversing cycle, a complete vertical oscillation of the ribbon occurring every thirty hours.

The printing platen is actuated by a two-lobed cam driven by the regulated motor. The platen is spring-biased toward the paper but pushed away once a second by a lever which is operated by the cam. When the end of the lever drops off the end of a lobe of the cam, the platen taps the chart and ribbon against the several recording pins, marginal markers and the reference marker when the latter is in its marking position.

A platen lock-out detent lever is located by the cam-operated lever to hold the platen well clear of the ribbon so that the chart can be readily inserted and also for cold-starting, at which time the chart-drive gearing may be turned by hand until its motor can carry the load. Adjusting screws for the platen stroke govern the strength of the recorded lines on the chart.

Each synchro receiver operates through an angle of 330°, or 165° each side of its electrical zero. Each receiver has its respective pulley of slightly less than 4 inches diameter. A thin multi-filament cellulose acetate cord is connected with the pulley and its indicating and marking pin. The cord passes from a groove in the drive pulley to the marking pin and then around an idler pulley at the opposite end of its scale, the cord returning to another idler pulley at the drive pulley end of the scale, and finally to another groove in the drive pulley, the cord being on the opposite side from that in the first-named groove and secured under negligibly slight tension to the drive pulley.

This arrangement enables the rotary movement of the receiver to be translated into longitudinal movement of the indicating and marking pin along its scale with a minimum of friction and with free operation over a very wide range of temperature. The vibrator-motor cooperates in obtaining this result by substantially eliminating errors due to mechanical friction. The platen is normally away from the paper and ribbon so that light springs on the back of the scales normally force the ribbon away from the pins, thus leaving the pins free to assume their correct positions.

A border marker is attached to one of the scales at each end to indicate true range limits on the chart so that effects of changes in width of the paper chart due to changes in relative humidity and temperature can be eliminated. In the middle of the chart is a reference marker which is actuated against a spring by a solenoid to come into marking position when the solenoid is energized. The reference marker records the times of noteworthy events such as the start of a trip or flight or the entry into a cloud.

The electrical system for operating the instrument when a motor switch is turned on includes a transformer producing the necessary voltages, 15, 40 and 100 volts from the 26 v., 400 cycle supply. As soon as the motor switch is turned on, the vibrator motor and the regulated motor both start instantly. The rotor coils of each of the four synchro receivers are energized and two of their three field coils shorted so that each synchro receiver is immediately brought to its electrical zero position.

After a 15-second warm-up delay, a duo-diode tube energizes the relay coil to operate the relay to connect each of the synchro receivers to its respective transmitter with the result that the receiver then moves its index and pin to a position corresponding with the value being transmitted.

This centering and delay feature is necessary to eliminate a tendency which otherwise exists for the synchro receiver to go to its end position when the starting position of the receiver happens to be near one end of the scale and its transmitter happens to be at the other when the telemetering circuit is first closed. Without this delay feature, it would be necessary to limit the total travel of the synchros to less than 180° which would result in a considerable loss of accuracy.

Each of the functionally related groups of elements is separately mounted as a readily detachable interchangeable sub-assembly to facilitate calibration or inspection and maintenance.

From the foregoing resume, it is manifest that a simple, lightweight, accurate, multipoint, indicator-recorder has been provided, by means of which the aforementioned objects have been attained.

Referring now to the drawings for a more detailed description and more particularly to Figure 1 thereof, the present invention is shown as comprising an instrument casing 30 provided with a cover 31 which in its assembled condition hooks on at the bottom of the casing and is secured to the top thereof by way of suitable latches 32. Cover 31, on the other hand, is provided with a window 34 which exposes to view scales 33 arranged near the bottom of the window as well as a section of a strip chart 35 containing recorded values of the functions being measured for a predetermined time interval.

Each of the scales 33 is provided with an index 36 for indicating the instantaneous measured value of each variable, the values being respectively recorded as represented by the lines 37 on the chart. Marginal lines 38 (only one being visible in Figure 1) are recorded continuously to provide a reference independent of temperature or humidity effects on the chart sheet while a reference mark 39, centrally shown on the chart, is recorded when the operator presses reference marker button 41. A suitable mounting bracket (not shown) is connected with the casing 30 by resilient shock mounts by means of which the instrument may be detachably secured to the craft.

The major components of the novel instrument of the present invention are shown in Figures 2–7, inclusive, wherein the cover and casing have been removed. For example, the chart feed roll 44 (Figure 6) is arranged at the front of the instrument, below indicating scales 33. A driving motor 45 is arranged, as shown in Figures 2 and 7 at the upper portion of the instrument and is connected by way of suitable gearing 46 with the escapement-differential mechanism 47 located below the motor and carried by framework 48.

Arranged to the rear of scales 33 is a multi-color inked ribbon 49 (Figures 4 and 6) carried by a pair of spaced parallel spools 51 which are driven from motor 45 through gearing 46 in one direction or another relative to the strip chart by means of a horizontal cross-shaft 52 (Figure 13). In order to effect periodic reversal of the ribbon, a cam 53 (see Figures 2 and 5) is provided which actuates a pivoted lever 54 (Figure 3) and, at a substantially lower rate, the entire ribbon mechanism generally designated with the reference character 55 in Figure 3.

Arranged at the top and front of the instrument, as shown in Figure 6, is a timing chart drive roller 56 which is also driven from gearing 46. To the rear of the roller is a tear-off bar or strip 57, re-roll spring clips or guides 58 and a pair of re-rollers 59 whose speed is designed to be higher than that of drive roller 56 to tightly wind the used portion of the strip chart.

A vibrator motor 61 is mounted on framework 48, as shown in Figure 3, and drives a mass 60 whereby mechanical friction imposed upon the indicating indices or marker pins is overcome. Also supported by the framework are conventional capacitors 62 for motors 45 and 61, the capacitors being arranged on each side of the vibrator motor. Chassis 63 of Figure 7 defines a support for the electrical zeroing means comprising the relay, tube, etc., generally designated with the reference character 64 in Figure 22. Above chassis 63 in the rear of the instrument is a torque tube 65 for the ribbon mechanism while behind the scales 33 and marking pins 66 are the ribbon 49 and paper chart 35.

As better shown in Figure 6, a platen 67 is normally biased toward the chart by means of springs 68 and urged away from the chart by means of levers 69 depending from a cross-shaft 71 one end of which is provided with a lever 72 (Figure 2) which is operated once a second by way of a timing cam 73 provided that lever 72 is not at that time held out of operation by a lock-out detent lever 74 (see Figure 4). A finger 70 attached to cover 31 depresses lever 74 when the instrument is assembled to release lever 72 into operative engagement with cam 73 thereby ensuring that records are made whenever the driving motor is connected to its power supply.

For purposes of clarity and for a better understanding of the present invention, the various features such as, the novel speed regulator, the chart handling means, platen operation, marker actuation, and the electrical system will be considered separately hereinafter.

*Constant speed regulator*

Inasmuch as the driving motor 45 is subject to speed variation with fluctuations in the power supply and since it is desirable to maintain the operating portions of the instrument at a substantially constant speed, the motor is connected by gearing 46 with a spur gear 80 (Figs. 8 and 9) which is attached to a shaft 81, the latter bearing a brake disc 82 which rotates between a fixed washer 83 and a floating washer 84 which is restrained against rotation by a fixed pin 85. Washer 84, moreover, is urged toward disc 82 by a spring 86 which is governed by a brake lever 87 pivoted at one end on a fixed pin 88, the other end of the brake lever being governed by the accumulated or integrated difference of the speed of shaft 81 from the desired constant speed.

Also actuated by gearing 46, but at a lower speed, is an idler pinion 89 which is connected with a gear 91 which is secured to a shaft 92. A gear 93 is connected with a constant speed escapement mechanism and has its hub 94 threaded internally for cooperation with the threads 95 provided on shaft 92 so that any difference in the relative speed of gears 91 and 93 is reflected by an axial movement of gear 93 relative to shaft 92. Gear hub 94 is provided with a circumferential groove 96 which supports one end of brake lever 87 to provide brake actuation to slow motor 45 until it runs at the desired speed. A torsional spring 97 connects gears 91 and 93 to permit rotation of gear 93 relative to gear 91, gear 93 being driven by the spring.

As more clearly shown in Figures 11 and 12, gear 93 drives a pinion 98 to which is affixed an escapement ratchet wheel 99. Two escapement pins 101 are oscillatably driven by the ratchet wheel and are mounted on a rock lever 102 which has a notch 103 that cooperates with an eccentric pin 104 on a balance wheel 105 which is timed by a spring 106. Balance wheel 105 and spring 106 are connected with a shaft 107 which is provided with a notch 108 that cooperates with another lever 109 that moves angularly with lever 102 to lock the rock lever 102 and escapement wheel 99 except at intervals timed by the balance wheel and spring 106, levers 102 and 109 being secured together and to their common shaft 111.

When motor driven shaft 92 rotates too rapidly, its thread 95 forces gear hub 94 away from gear 91 to move brake lever 87 in a direction to exert pressure on spring 86 and on high speed brake disc 82 so that motor 45 is gradually slowed down to the speed that corresponds with that of escapement controlled gear 93. By this provision a novel and efficient lightweight drive has been provided which is substantially independent of frequency and voltage variations of the power supply.

*Chart operation*

As more clearly shown in Figure 2, the chart feed roll 44 is slipped on a stud 112 which is fixed in framework 48. A friction drag is provided at the opposite end of the roll comprising a spring 113 acting against a grooved hub 114 which turns with the chart feed roll, the hub being rotatably mounted on a lever 115 which is pivotally mounted on a pin 116 which is attached to the framework 48. Lever 115 is also connected with the framework by tension spring 117 (Figure 6) which biases lever 115 against a stop portion 118 of the framework. As shown in Figure 5, screw adjustment 119 is provided on the framework to insure horizontal alignment of the paper feed roll.

The strip chart is threaded upwardly over an idler roller 121 (Figure 6) which is shorter than the width of the paper and centrally located thereof and between ribbon 49 and platen 67 upwardly to chart drive roller 56, the two ends of which are provided with a plurality of chart driving pins 122. Chart drive roller 56 is supported on a shaft 123 which carries a hub 124 fixed near one end thereof and which supports thereon a plurality of spacer hubs 125 (Figure 2), the shaft being driven at a constant speed by gearing 46 which includes an irreversible slip clutch generally designated with the reference character 76. This clutch permits the chart drive roller 56 to be turned in one direction only, the drive being overpowered by means of a knob 75 arranged at the opposite end of the roller.

Chart drive roller shaft 123 is connected by gearing 46' with a hub 127 (Fig. 15) of the slip clutch, springs 128 being connected to the clutch gear to coact with notches 129 formed in the face of hub 127 adjacent the gear so that the springs exert a frictional effect during part of a revolution and at the same time act as pawls coacting with notches or ratchet teeth 129. Gearing 131

(Fig. 2) connects shaft 123 with two friction rollers 59 so that, when shaft 123 is turned either manually or by motor 45, both roller 56 and re-rollers 59 are operated at the same time. Spring guides or clips 58 (Figure 6), secured to the framework by levers 130, guide and hold the chart in a roll while it is being re-rolled by rollers 59.

The opposite end of roller 56 is provided with a hub 133 having a plurality of chart engaging pins 122 thereon for driving the chart together with hub 124, hub 133 being free to move axially relative to shaft 123 with changes in the width of the chart but is restrained against turning by pin 134 which is fixed to shaft 123 and coacts with a slot 132 in hub 133.

Ribbon drive

The complete mechanism for driving the ribbon together with its automatic reversing means is illustrated in Figures 2, 3, 5, 7 and 13 wherein the ribbon driving shaft 52 is shown operated from gearing 46 by virtue of a slotted hub and pin drive 135. Pinion bevel gears 136 and 137 are fixed to shaft 52 and respectively engage related bevel gears 138 and 139 for reversibly feeding the ribbon. Each of gears 138 and 139 is attached to the upper end of its respective shaft 141 which has mounted on its lower end a slip clutch 142 that carries depending pins 143. Each of the ribbon spools 51 is mounted on a vertical shaft 144 in which, at its upper end, is fixed the horizontal pin 145 in the path of pins 143 so that the latter angularly drive shaft 144. With the above clutch arrangement, the first complete traverse and reversal of the ribbon, put the ribbon into normal operation without further slipping of either of the clutches.

Each spool 51, moreover, is rotatably mounted so that its shaft turns freely in a yoke lever 146 which is fixed to the torque tube 65 which extends horizontally across the rear of the instrument and having its ends pivotally and detachably connected with the framework. One end of tube 65 slips over a stud 147 (Fig. 7) which is fixed in the framework while the other end is snapped over a conical center 148 which is pressed toward the tube by a spring 149 whose opposite end abuts against the framework. Since both yoke levers 146 are attached to tube 65, the spools 51 move together in a vertical direction.

The chart drive roller shaft 123 is also connected by gearing 131 with a gear 151 whose hub 152 carries an irreversible helical-spring clutch 153. Also rotatably mounted on hub 152 is the four lobed reversing cam 53 which has alternate lobes 155 pointing in opposite directions.

The ribbon reversing lever 54 has pivotally mounted thereon near its free end a roller 156 which is moved in a direction generally parallel to the axis of hub 152 by the lobes 155, being retained in its new position by the then adjacent segment portion 157 of cam 153. The resultant operation is that a steady rotation of gear 151 and cam 53 produce reciprocating motion of roller 156 and reversing lever 54 once every one and one half hours when cam 53 rotates once every six hours.

The ribbon reversing lever 54 also carries, near its free end, a spring pawl 158 which engages a ratchet wheel 159 that is provided with a two lobed flat cam 160 on its opposite side. Since ratchet wheel 159 has 40 teeth, cam 160 operates a ribbon oscillating pin 161 to make one oscillation every thiry hours. Pin 161 is slidably mounted in the framework to reciprocate vertically its lower end being pressed upwardly by a bolt 162 which is fastened to one of the yoke levers 146, the other of the levers being biased upwardly by a spring 170 as shown in Figure 13.

The resulting operation is that both yoke-levers 146 and their spools 51 rise and fall together through a complete oscillation in every thirty hours, each spool 51 being meanwhile driven by gears 138 or 139 and its then related gear 136 or 137. The vertical stroke or oscillation of ribbon 49 is slightly less than one-quarter of the total width of the ribbon where a four color ribbon is used thus insuring that practically all of the ribbon is used up evenly.

The outer end of each yoke lever 146 carries a vertical roller 163 (Figures 3 and 13) which is rotatably mounted on its related lever while guiding members 164 are provided for the ribbon adjacent each roller 163 and attached to the yoke levers through which the ribbon may be threaded so that it will positively move vertically with the yoke levers, a guiding portion thereby being provided at both edges of the ribbon on both sides of each roller 163. Each spool 51 at its bottom is provided with braking means 150 so that ribbon 49 is kept taut between the two guide rollers 163 and guide members 164.

Platen operation

As pointed out hereinabove, platen 67 is actuated by lever 72 which, when released by detent lever 74, is urged by means of springs 58 toward cam 73 and drops quickly from the tip to the root of the tooth of cam 73 as the end of lever 72 passes the tip of the tooth. Cam 73 is preferably made of chrome-plated hardened steel and has a smoothly polished surface. The end of lever 72 is made of hardened steel which is also chrome-plated and provided with an oil felt wiper 165, a construction which ensures long life of this rapidly working part.

The platen lock-out detent lever 74 is pivotally mounted on the framework 48 and urged into contact with a cooperating portion of lever 72 by spring 166 whose lower end is attached to lever 72 and whose upper end is connected with the adjustable eccentric pin 167. The arrangement is such that, when the lever 74 holds lever 72 away from cam 73, the rotation of cam 73 does not cause operation of the platen 67 but holds the latter a greater-than-normal distance away from the chart 35.

The lower end of lever 72 is connected to cross-shaft 71 which carries the two depending levers 69 which push against the adjustable screws 168 (see Fig. 14) to move the platen 67 back against the action of its springs 68.

Platen 67 is connected to two parallel pins 169 which slide in guide holes in framework 48. The result is that the platen 67, when the end of lever 72 slides off the end of a tooth of cam 73, is moved sharply toward the chart 35 by springs 68 to make a legible impression on chart 35 of each of the marking pins 66 through its respective colored portion of the ribbon 49. The back of one of the scales 33 is provided with the margin marking pins 171 which make two lines 38 just ten inches, e. g., apart so that the expansion or contraction of the paper due to relative humidity may be corrected for.

A reference marking pin 172 (see Figs. 17 and 21) is normally biased to an inoperative position, i. e., above the platen 67, by spring 173, one end of which is fixed to the adjacent scale 33. A solenoid 174, when energized, operates its plunger 174' to move the reference marker pin 172 to an operative position against the bias of spring 173. Solenoid 174 is energized by a switch (not shown) which is operated by reference marker button 41 (see Fig. 1) which is pressed by the operator to record the time of some noteworthy event such as the start of a trip of a craft or its entry into a cloud or fog.

Synchro marker actuation

For a detailed description of the marker or index operation by the synchronous repeaters reference is made to Figures 2, 17–20. Each synchro receiver 175 has a rotatable shaft 176 carrying a pulley 177 of slightly less than 4 inch diameter. Ears 178 on each pulley 177 engage a respective stop 180 attached to framework 48 to limit the angular movement of each pulley to substantially 330°.

Each pulley has two peripheral grooves 179 and 181. A multi-filament (10-thread) cord of virgin spun cellulose acetate thread 182 has one end attached in groove 179 from which the cord extends straight across the chart to an idler pulley 183. Attached to the straight portion of the cord is the indicating and marking pin 66, the inner end of the pin being rounded to make an impression through ribbon 49 on chart 35 when the latter is tapped by the platen 67.

Normally, the platen is out of engagement with the chart 35 and the ribbon 49 is then pressed away from the marking end of pins 66 by weak strip springs 184 so that each pin 66 can move freely with its cord 182. The cord from idler pulley 183 returns across the chart in front of the scales to idler pulley 183' and thence to the groove 181 in the pulley 177 to which it is fastened under extremely slight tension. Idler pulleys 183, 183', pulley 177 and ribbon 49 are disposed in substantially the same plane to provide for using a plurality of ribbons side by side to indicate a plurality of variables on a single chart.

The vibrator motor 61 rotates its eccentric weight 60 at high speed when the system is operating so that there is a minimum of error due to mechanical friction in the instrument.

*Electrical system*

Refer to Figure 22 which shows the diagram of the electrical system. The lights 188 are connected with the supply line 185 by the light switch 189. A supply line 185 is connected to the 26-volt tap of the auto-transformer 186 by closing the motor switch 187. In series with motor switch 187 is fuse 191, which is connected to motors 45 and 61 in parallel, each motor having its own capacitor 62, with the result that closing the motor switch 187 starts both motors.

The relay 195 has armature 190 spring-biased away from its stationary core with eight contacts 197 closed and single contact 193 open when the coil is de-energized, as shown on Figure 22.

Closing the motor switch 187 energizes the 40-volt armature coil 192 at the synchro-receiver 175. Since telemetering contact circuit switch 193 is open when the motor switch 187 is first closed, this 40-volt A. C. potential is not then impressed upon armature coil 194 at the synchro transmitter. At this time, i. e., when first starting up, the coil of relay 195 is not yet energized, with the result that the relay switch 193 is still open so that the 40-volt potential is not yet supplied to the telemetering circuit connecting the synchro transmitters 190 with the synchro receivers 175. Incidentally, the disconnect 196 is conveniently located on the instrument case 30. At this time, relay contacts 197 are still closed, to short two of the field coils of the synchro receiver 175 and putting both of these in series with the 15 volt A. C. potential from auto-transformer 186. The result is that the receiver armature coil 192 automatically comes to its electrical zero position at this time.

In the meantime, the duo-diode tube 198 is warming up since it is connected, by closing the motor switch 187, with the 26 volt supply 185. After about 15 seconds, during which the armature 192 of each synchro receiver 175 has come to its electrical zero position, the duo-diode tube 198 acts to energize the coil of the relay 195 to then operate the relay armature 190 to close switch 193 and open all contacts 197. When relay contacts 197 are opened and relay contact 193 is closed, the receiver armature 192 immediately moves to a position corresponding with that of armature 194 of the synchro transmitter 190, thus putting the instrument into complete operation.

Switch 199 is operated by the reference marker 41 to energize the coil of solenoid 174. Alternatively, this solenoid 174 may be energized by closing switch 200 which is located remotely of the instrument.

It is apparent that a simple electrical system has been provided which is well suited to the needs of any craft having the usual A. C. power supply.

In the claims, a synchro used for telemetering includes an armature having a single phase winding energized from an A. C. supply, and a winding equivalent to two or more coils, preferably three for present purposes, in inductive relation with the armature coil and connected with telemetering circuits.

Although but one embodiment of the present invention has been illustrated and described in detail, it is to be expressly understood that the invention is not limited thereto. Various changes in the design and arrangement of the parts can be made without departing from the spirit and scope of the invention and the same will now be understood by those skilled in the art. For example, an equivalent of the duo-diode would be any other time-delay means for energizing the relay coil 195 at a suitable interval after the receiver had been energized to thus allow its armature to be electrically centered so that, upon starting up, the receiver would not go to its limits but would immediately take up a position corresponding to that of its transmitter. For a definition of the limits of the invention, reference will be had primarily to the appended claims.

We claim:

1. In combination with a recording instrument having a marker linearly movable across a chart in response to the value of a variable being measured together with means for actuating said marker as a function of the variable being measured, a platen for urging said chart against said marker, a removable casing for said instrument, means adapted for operation when said casing has been removed from said instrument for holding said platen in an inoperable position, and means carried by said casing and operable when said instrument has been placed in said casing for releasing said platen holding means.

2. A recording instrument for a flat traveling chart having a marking face, comprising a linear guide extending transversely to, along said face of and adjacent to the chart, means for marking the chart, including a marking element traveling along the guide and said face of the chart, a marking ribbon extending between the marking element and the chart along the path of the marking element, a platen movably mounted on the opposite side of the chart from the ribbon, yieldable means biasing the platen toward the chart, means for holding the platen out of marking engagement with the chart against the action of the yieldable means, and means for periodically actuating the holding means and thereby bringing the platen into marking engagement with the chart by the action of the yieldable means.

3. A recording instrument for recording a plurality of variables on a flat traveling chart having a marking face, comprising a plurality of linear parallel adjacent guides extending transversely to the chart in marking relation thereto, a plurality of marking elements each mounted for travel along a guide and normally out of marking relation to the chart, a marking ribbon extending transversely to the chart between the paths of said marking elements and the chart, means for positioning each marking element in accordance with the value of a variable, and means for bringing all of said marking elements simultaneously into marking position in engagement with said ribbon and chart to mark the positions of said indicators on the chart, comprising a platen movably mounted in alignment with the paths of all of the marking elements on the opposite side of the chart, and means for periodically shifting the platen towards said elements and thereby bringing the chart, ribbon and marking elements simultaneously into marking position.

4. A recording instrument for a flat traveling chart, comprising a marking element mounted for travel in a path transverse to and spaced from the chart, means for moving the marking element along said path, a marking ribbon extending between the marking element path and the chart, means for periodically bringing the marking element into marking engagement with the ribbon and chart, and means for biasing the ribbon away from the marking element during intervals between such engagements, whereby the marking element is free from frictional contact with the ribbon during movement.

(References on following page)

References Cited in the file of this patent

UNITED STATES PATENTS

| | | | |
|---|---|---|---|
| 1,695,919 | Gould | Dec. 18, | 1928 |
| 1,850,978 | Sperry | Mar. 22, | 1932 |
| 1,975,180 | Sparling | Oct. 2, | 1934 |
| 2,001,335 | Urfer | May 14, | 1935 |
| 2,120,136 | Lyman | June 7, | 1938 |
| 2,474,663 | Goddard | June 28, | 1949 |

FOREIGN PATENTS

| 447,809 | Great Britain | May 25, 1936 |
|---|---|---|